United States Patent
Dery St-Cyr et al.

(10) Patent No.: US 10,065,697 B2
(45) Date of Patent: Sep. 4, 2018

(54) STORAGE CONTAINER ASSEMBLY FOR A VEHICLE

(71) Applicant: BOMBARDIER RECREATIONAL PRODUCTS INC., Valcourt (CA)

(72) Inventors: Karl Dery St-Cyr, St-Denis-de-Brompton (CA); Simon Marcouiller, Saint-Denis-de-Brompton (CA); Matthieu Gregoire, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 15/513,673

(22) PCT Filed: Sep. 23, 2015

(86) PCT No.: PCT/IB2015/057344
§ 371 (c)(1),
(2) Date: Mar. 23, 2017

(87) PCT Pub. No.: WO2016/046773
PCT Pub. Date: Mar. 31, 2016

(65) Prior Publication Data
US 2017/0247074 A1     Aug. 31, 2017

Related U.S. Application Data

(60) Provisional application No. 62/053,954, filed on Sep. 23, 2014.

(51) Int. Cl.
*B62J 9/00*     (2006.01)
*B62K 19/46*     (2006.01)
(Continued)

(52) U.S. Cl.
CPC ............... *B62J 9/001* (2013.01); *B62K 11/02* (2013.01); *B62K 11/14* (2013.01); *B62J 9/00* (2013.01); *B62K 19/46* (2013.01)

(58) Field of Classification Search
CPC ..... B62J 9/00; B62J 9/001; B62J 9/02; B62K 19/46
(Continued)

(56) References Cited

U.S. PATENT DOCUMENTS

| 3,795,354 A | 3/1974 | Stippich |
| 4,773,573 A | 9/1988 | Doveri |

(Continued)

FOREIGN PATENT DOCUMENTS

| DE | 102006018237 A1 | 10/2007 |
| GB | 281902 A | 12/1927 |

(Continued)

OTHER PUBLICATIONS

International Search Report of PCT/IB2015/057344; dated Feb. 2, 2016; Shane Thomas.

(Continued)

*Primary Examiner* — Justin Larson
(74) *Attorney, Agent, or Firm* — BCF LLP

(57) ABSTRACT

A storage container assembly for connecting to a frame of a vehicle has a mounting bracket defining at least one aperture adapted to receive at least one first anchor of the vehicle therein, a storage container mounted to the mounting bracket and having a cover, the cover having an open position providing access to an interior of the storage container and a closed position preventing access to the interior of the storage container, a sliding member translatable between a retracted position and an extended position, the sliding member being adapted to engage a second anchor of the vehicle, and an actuator for translating the sliding member (Continued)

from the retracted position to the extended position. The actuator is disposed at least in part in the interior of the storage container and is accessible when the cover is in the open position. A vehicle having the assembly is also disclosed.

21 Claims, 16 Drawing Sheets

(51) Int. Cl.
  *B62K 11/02* (2006.01)
  *B62K 11/14* (2006.01)
(58) Field of Classification Search
  USPC .......................................................... 224/413
  See application file for complete search history.

(56) References Cited

U.S. PATENT DOCUMENTS

| | | | |
|---|---|---|---|
| 5,664,715 A | 9/1997 | Gogan et al. | |
| 5,667,232 A | 9/1997 | Gogan et al. | |
| 5,732,965 A | 3/1998 | Willey | |
| 6,443,344 B1 | 9/2002 | Nicosia et al. | |
| 6,484,914 B1 | 11/2002 | Willey | |
| 6,520,275 B2 | 2/2003 | Galbraith et al. | |
| 6,655,740 B1 | 12/2003 | Hanagan | |
| 6,729,515 B2 | 5/2004 | Nicosia et al. | |
| 6,820,782 B1 | 11/2004 | Monson | |
| 6,830,169 B1 | 12/2004 | Campbell | |
| 7,036,837 B1 | 5/2006 | Bauer et al. | |
| 7,654,496 B2 | 2/2010 | Sharpe et al. | |
| 7,661,761 B1 | 2/2010 | Ortega | |
| 8,146,944 B2 | 4/2012 | Miller | |
| 8,162,091 B2 | 4/2012 | Laperle et al. | |
| 8,172,188 B2 | 5/2012 | Dubinskiy et al. | |
| 8,579,063 B2 | 11/2013 | Smith et al. | |
| 8,579,169 B2 | 11/2013 | Racz et al. | |
| 2004/0149792 A1 | 8/2004 | Akita | |
| 2005/0150921 A1 | 7/2005 | Schneider | |
| 2006/0163302 A1 | 7/2006 | Knoch et al. | |
| 2009/0001114 A1 | 1/2009 | Sonnetag | |
| 2011/0315728 A1 | 12/2011 | Ghormley | |

FOREIGN PATENT DOCUMENTS

| | | |
|---|---|---|
| GB | 2400088 A | 10/2004 |
| TW | 200909285 A | 3/2009 |
| WO | 2014033953 A1 | 3/2014 |

OTHER PUBLICATIONS

Supplementary European Search Report of EP15844767.2; Luis Verdelho; dated May 15, 2018; TheHague.
English Abstract of TW200909285; retrieved from the Internet: <URL: http://www.worldwide.espacenet.com>.
English Abstract of DE102006018237; retrieved from the Internet: <URL: http://www.worldwide.espacenet.com>.

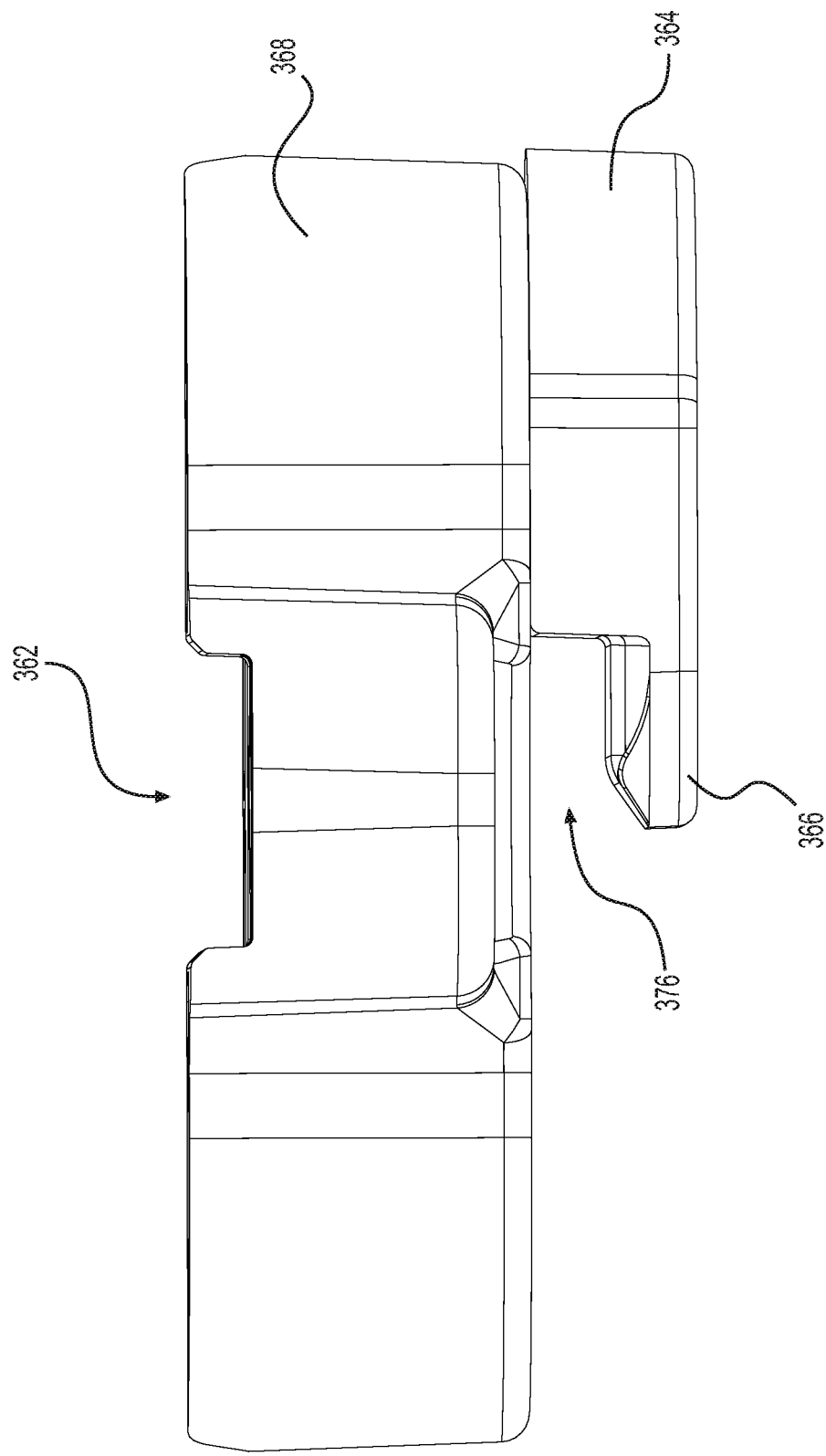

STORAGE CONTAINER ASSEMBLY FOR A VEHICLE

CROSS-REFERENCE

The present application claims priority to U.S. Provisional Patent Application No. 62/053,954, filed Sep. 23, 2014, the entirety of which is incorporated herein by reference.

FIELD OF TECHNOLOGY

The present technology relates to storage container assemblies for vehicles.

BACKGROUND

Many vehicles, such as motorcycles or three-wheel on-road vehicles, are not provided with a trunk, such as in a car, which allows the user of such vehicles to bring various items along while riding. Some three-wheel on-road vehicles are provided with built-in storage compartments in the front portion of the vehicle, but the dimensions of these are limited to the dimensions of the front portion of the vehicle, and as such some users may desire additional storage capacity.

To remedy this problem, storage container assemblies can be attached to either side of the straddle seat of the motorcycle or three-wheel vehicle. These are usually provided as accessories. The assemblies typically include a storage container and a mounting system. Theses storage containers are sometimes referred to as saddlebags. Advantageously, some of these containers can be removed from the vehicle such that the user can use them as luggage.

As such, it is desirable that the storage container be mounted to the vehicle, via the mounting system, so as to be easily removable (and then installed), but in such a way as to deter theft of the storage container, and the contents thereof, when left on the vehicle. However, many storage container assemblies, in an effort to deter theft, require complex operations from the user and/or the use of tools in order to install and remove the storage container.

Also, installing the mounting system on the vehicle can also require many parts and can be a complex operation. In some cases, the parts of the mounting system can be intrusive and not aesthetically pleasing when the storage container is not installed on the vehicle.

SUMMARY

It is an object of the present technology to ameliorate at least some of the inconveniences present in the prior art.

According to one aspect of the present technology, there is provided a vehicle having a frame, at least one seat mounted to the frame, and a storage container assembly selectively connected to the frame. The storage container assembly has a mounting bracket, a storage container mounted to the mounting bracket, a sliding member translatable between a retracted position and an extended position, and an actuator for translating the sliding member from the retracted position to the extended position. The storage container has a cover. The cover has an open position providing access to an interior of the storage container and a closed position preventing access to the interior of the storage container. The actuator is disposed at least in part in the interior of the storage container. The actuator is accessible when the cover is in the open position. The cover prevents access to the actuator when in the closed position. At least one first anchor is connected to one of the frame and the mounting bracket. At least one aperture is defined in another one of the mounting bracket and the frame. The at least one first anchor is received in the at least one aperture. A second anchor is connected to one of the frame and the sliding member. The second anchor engages another one of the frame and the sliding member when the sliding member is in the extended position. The second anchor is spaced from the other one of the frame and the sliding member when the sliding member is in the retracted position. The storage container assembly is removable from the frame when the sliding member is in the retracted position. The at least one first anchor and the second anchor lock the storage container assembly to the frame when the sliding member is in the extended position.

In some implementations of the present technology, the at least one first anchor is two first anchors, and the at least one aperture is two apertures.

In some implementations of the present technology, the two first anchors and the second anchor are mounted to the frame, and the two apertures are defined in the mounting bracket.

In some implementations of the present technology, the sliding member has a first end and a second end. The first end is disposed closer to the actuator than the second end. The second anchor abuts the second end of the sliding member when the sliding member is in the extended position and is spaced from the second end of the sliding member when the sliding member is in the retracted position.

In some implementations of the present technology, the sliding member translates longitudinally between the retracted and extended positions. The second end of the sliding member defines a recess. The second anchor is received in the recess when the sliding member is in the extended position and is outside of the recess when the sliding member is in the retracted position.

In some implementations of the present technology, the two first anchors have a first head having a first diameter, the second anchor has a second head having a second diameter, the two apertures have at least a portion that is narrower than the first diameter, and the recess of the sliding member has at least a portion that is narrower than the second diameter.

In some implementations of the present technology, the two apertures each have a first portion having a third diameter and a second portion extending toward a front of the vehicle from the first portion. The third diameter is greater than the first diameter and the second portion is narrower than the first diameter. The two first anchors are received in the second portions of the two apertures when the sliding member is in the extended position.

In some implementations of the present technology, the second end of the sliding member is closer to a front of the vehicle in the extended position than in the retracted position.

In some implementations of the present technology, the two first anchors and the two apertures are vertically higher than the second anchor and the sliding member.

In some implementations of the present technology, a grab handle is connected to the frame and disposed in proximity to the seat. The two first anchors are connected to the grab handle.

In some implementations of the present technology, a cam is connected to the actuator. The actuator pivots the cam between a first position and a second position. In the first position of the cam, the sliding member is in the retracted position and the cam abuts the sliding member. In the second position of the cam, the sliding member is in the extended position and the cam abuts the sliding member.

In some implementations of the present technology, the actuator pivots the cam about a pivot axis. The sliding member translates along a translation axis. When the cam is in the second position and the sliding member is in the extended position, a contact point between the cam and the sliding member is disposed on a line passing through the pivot axis. The line is parallel to the translation axis.

In some implementations of the present technology, the sliding member is disposed at least in part between the mounting bracket and the storage container.

In some implementations of the present technology, the storage container assembly also has a lock for locking the cover in the locked position.

In some implementations of the present technology, the vehicle also has a motor supported by the frame, a least two wheels operatively connected to the frame, at least one of the at least two wheels being operatively connected to the motor, and a handlebar operatively connected to at least one of the at least two wheels. The at least one seat is a straddle seat. The storage container assembly is disposed beside the straddle seat.

In some implementations of the present technology, the second anchor defines a gap. An end of the sliding member is received in the gap when the sliding member is in the extended position.

According to another aspect of the present technology, there is provided a storage container assembly for connecting to a frame of a vehicle. The storage container assembly has a mounting bracket defining at least one aperture adapted to receive at least one first anchor of the vehicle therein, a storage container mounted to the mounting bracket, a sliding member translatable between a retracted position and an extended position, the sliding member being adapted to engage a second anchor of the vehicle, and an actuator for translating the sliding member from the retracted position to the extended position. The storage container has a cover. The cover has an open position providing access to an interior of the storage container and a closed position preventing access to the interior of the storage container. The actuator is disposed at least in part in the interior of the storage container. The actuator is accessible when the cover is in the open position. The cover prevents access to the actuator when in the closed position.

In some implementations of the present technology, the at least one aperture is two apertures.

In some implementations of the present technology, the sliding member has a first end and a second end. The first end is disposed closer to the actuator than the second end. The second end of the sliding member defines a recess adapted for receiving the second anchor when the sliding member is in the extended position.

In some implementations of the present technology, the at least one aperture has at least a portion that is narrower than a diameter of a head of the at least one first anchor, and the recess has at least a portion that is narrower than a diameter of a head of the second anchor.

In some implementations of the present technology, the two apertures each have a first portion having a third diameter and a second portion extending toward a front of the vehicle from the first portion. The third diameter is greater than the first diameter, and the second portion is narrower than the first diameter. The two first anchors are received in the second portions of the two apertures when the sliding member is in the extended position.

In some implementations of the present technology, the at least one aperture is vertically higher than the sliding member.

In some implementations of the present technology, the at least one aperture is vertically higher than the storage container.

In some implementations of the present technology, a cam is connected to the actuator. The actuator pivots the cam between a first position and a second position. In the first position of the cam, the sliding member is in the retracted position and the cam abuts the sliding member. In the second position of the cam, the sliding member is in the extended position and the cam abuts the sliding member.

In some implementations of the present technology, the actuator pivots the cam about a pivot axis. The sliding member translates along a translation axis. When the cam is in the second position and the sliding member is in the extended position, a contact point between the cam and the sliding member is disposed on a line passing through the pivot axis. The line is parallel to the translation axis.

In some implementations of the present technology, the cam is disposed between the actuator and the mounting bracket.

In some implementations of the present technology, the sliding member is disposed at least in part between the mounting bracket and the storage container.

In some implementations of the present technology, a lock is provided for locking the cover in the locked position.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 16 is a top plan view of the anchor of FIG. 14.

DETAILED DESCRIPTION

The present technology will be described in terms of a storage container assembly being mounted to an on-road three-wheel vehicle having a straddle seat. However, it is contemplated that at least some aspects of the present technology could be used on storage container assemblies for other types of vehicles, such as, but not limited to, three-wheel vehicles having bucket seats such as the T-Rex™ from Campagna Motors™, motorcycles, off-road vehicles, vehicles having four or more wheels, snowmobiles, and bicycles.

Figure 1:
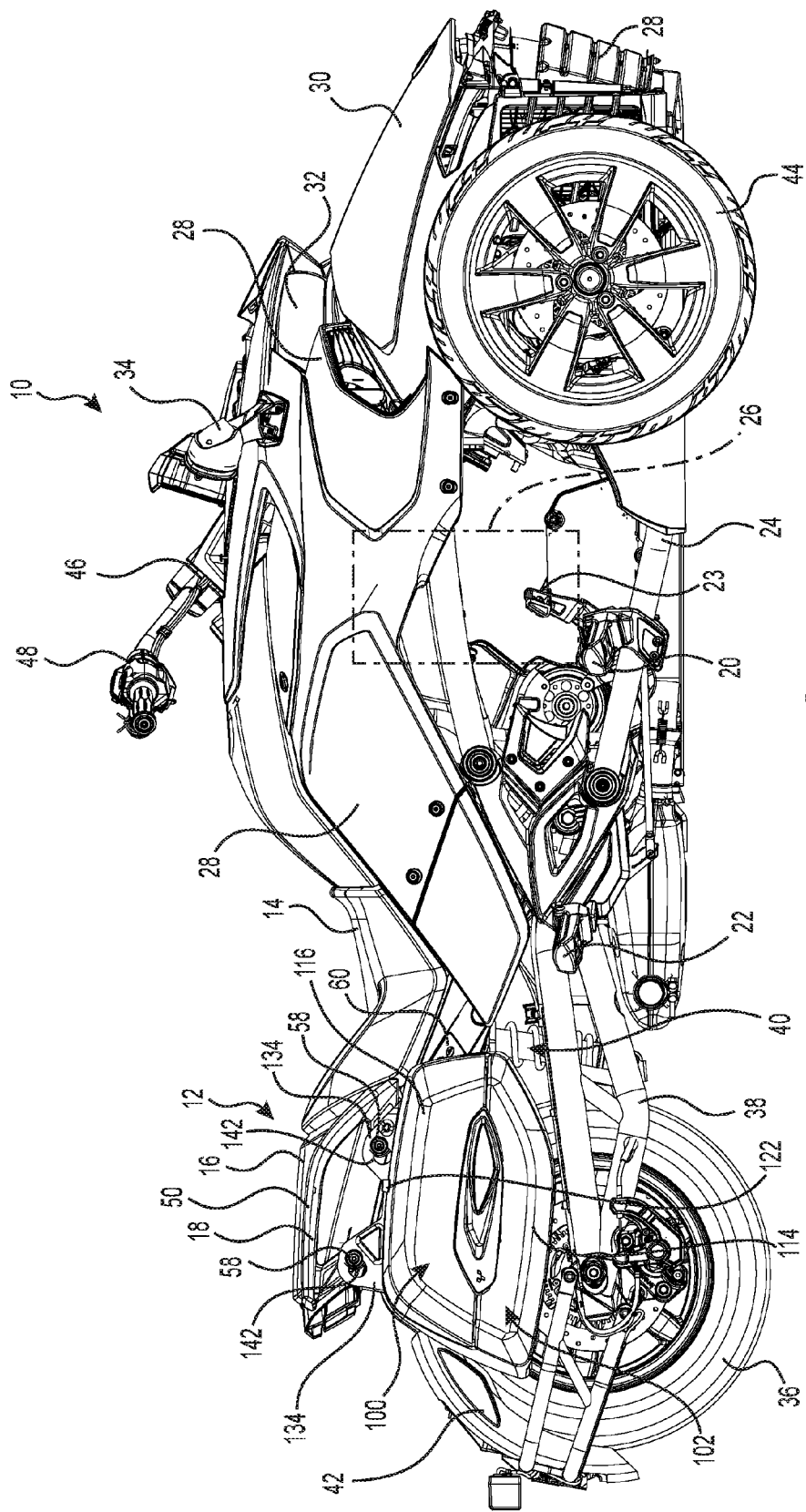
FIG. 1 is a right side elevation view of a three-wheel vehicle having storage container assemblies, with the right storage container assembly in a locked position and a cover of the right storage container being in a closed position.

FIG. 1 illustrates a three-wheel vehicle 10 in accordance with one implementation of the present technology. The three-wheel vehicle 10 is a straddle-type vehicle having a straddle seat 12 adapted to accommodate one or two adult sized riders. The straddle seat 12 includes a forward seat portion 14 for the driver and a rear seat portion 16 for a passenger. A handle 18 is provided beside each side of the rear seat portion 16 as will be described in greater detail below. A pair of foot pegs 20 (one foot peg 20 on each side of the three-wheel vehicle 10) and a pair of foot pegs 22 (one foot peg 22 on each side of the three-wheel vehicle 10) used by the driver and the passenger respectively, for resting their feet onto during riding. It is contemplated that the three-wheel vehicle 10 could not have the rear seat portion 16, and be adapted to accommodate only the driver and that accordingly the three-wheel vehicle 10 would only have the pair of foot pegs 20. A brake pedal 23 for braking the vehicle 10 is provided above the right foot peg 20.

The three-wheel vehicle 10 has a frame 24. As can be seen in 2, the straddle seat 12 is mounted to and supported by the frame 24. A motor 26 (schematically shown in FIG. 1) is mounted to and supported by the frame 24 forward of the straddle seat 12. In the present implementation, the motor 26 is an internal combustion engine, but any type of power source is contemplated such as, but not limited to, an electric motor.

Body panels 28 (only some of which are labeled in FIG. 1 for clarity) are connected to the frame 24. At the front of the vehicle 10, the body panels 28 at least partially enclose the motor 26. One of the body panels 28 forms a hood 30 that can be pivoted to access a front storage box (not shown). The body panels 28 also define apertures or recesses to receive the headlights 32 (only one of which can be seen in FIG. 1) of the vehicle 10. Rearview mirrors 34 (only one of which can be seen in FIG. 1) are mounted to the body panels 28 forward of the seat 12.

Two storage container assemblies 100 are mounted to the frame 24 at a rear of the three-wheel vehicle 10 (one on each side) behind the pair of foot pegs 22. As can be seen for the right storage container assembly 100, the storage container assemblies 100 are disposed beside the seat portion 16 on either side thereof below the handles 18. The storage container assemblies 100 will be described in more detail below. It is contemplated that only one storage container assembly 100 could be provided.

A single rear wheel 36 is mounted to a swing arm 38, which forms part of the frame 24, and is suspended from the vehicle 10 via a rear suspension system 40 at the rear of the frame 24. The single rear wheel 36 is driven by the engine 26 via a belt and sprocket system and a transmission (not shown). A rear fender 42 partially covers the rear wheel 36. A pair of front wheels 44 is suspended from the front of the frame 24 via front suspension assemblies (not shown). The front wheels 44 are operatively connected to a steering column 46. The steering column 46 is connected to a handlebar 48, such that when the driver turns the handlebar 48 in one direction, the front wheels 44 are steered in the corresponding direction. A throttle actuator (not shown) for controlling the speed of the vehicle 10 is provided on the handlebar 48.

Figure 2:
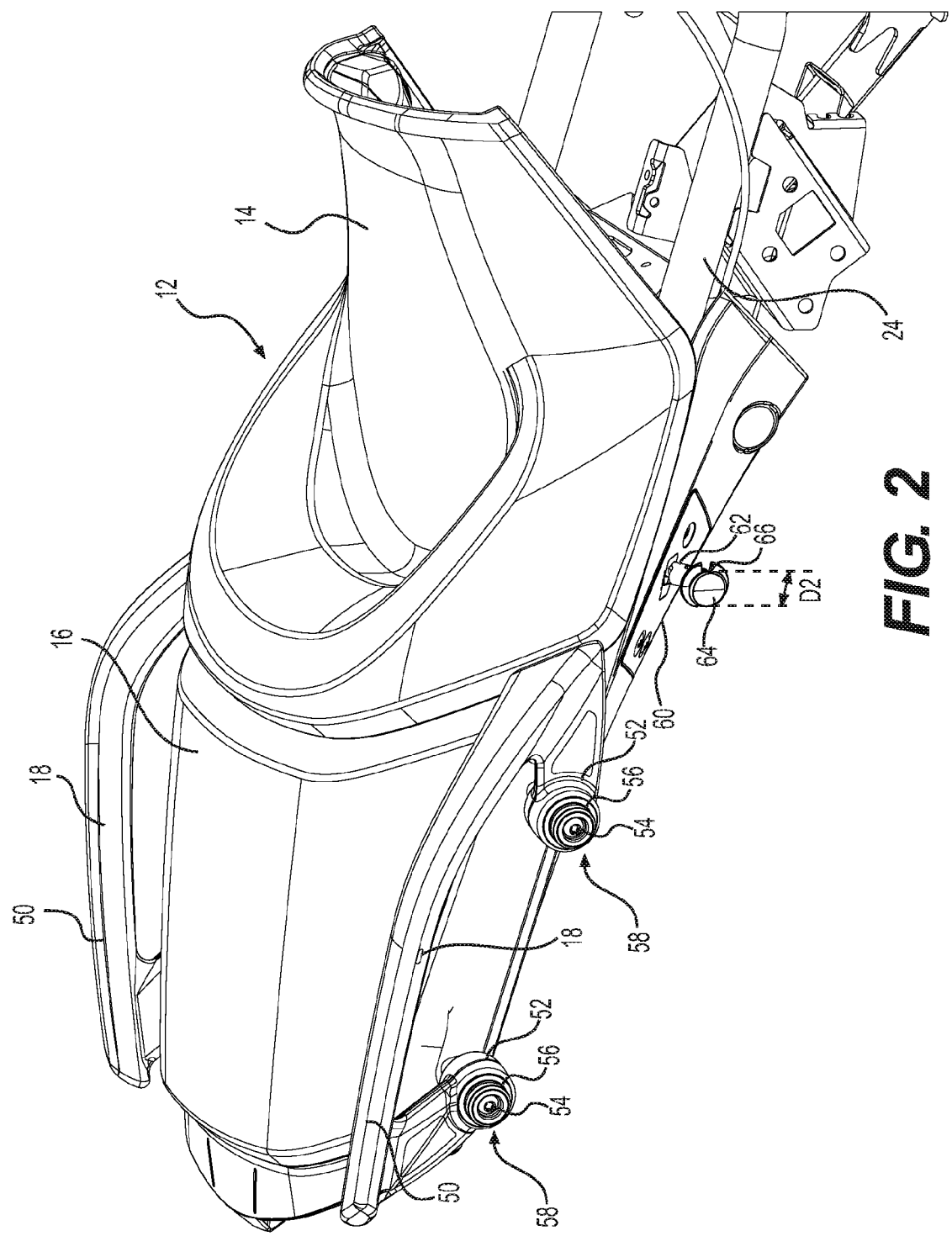
FIG. 2 is a perspective view taken from a front, right side of a straddle seat and frame portion of the vehicle of FIG. 1.
Figure 3:
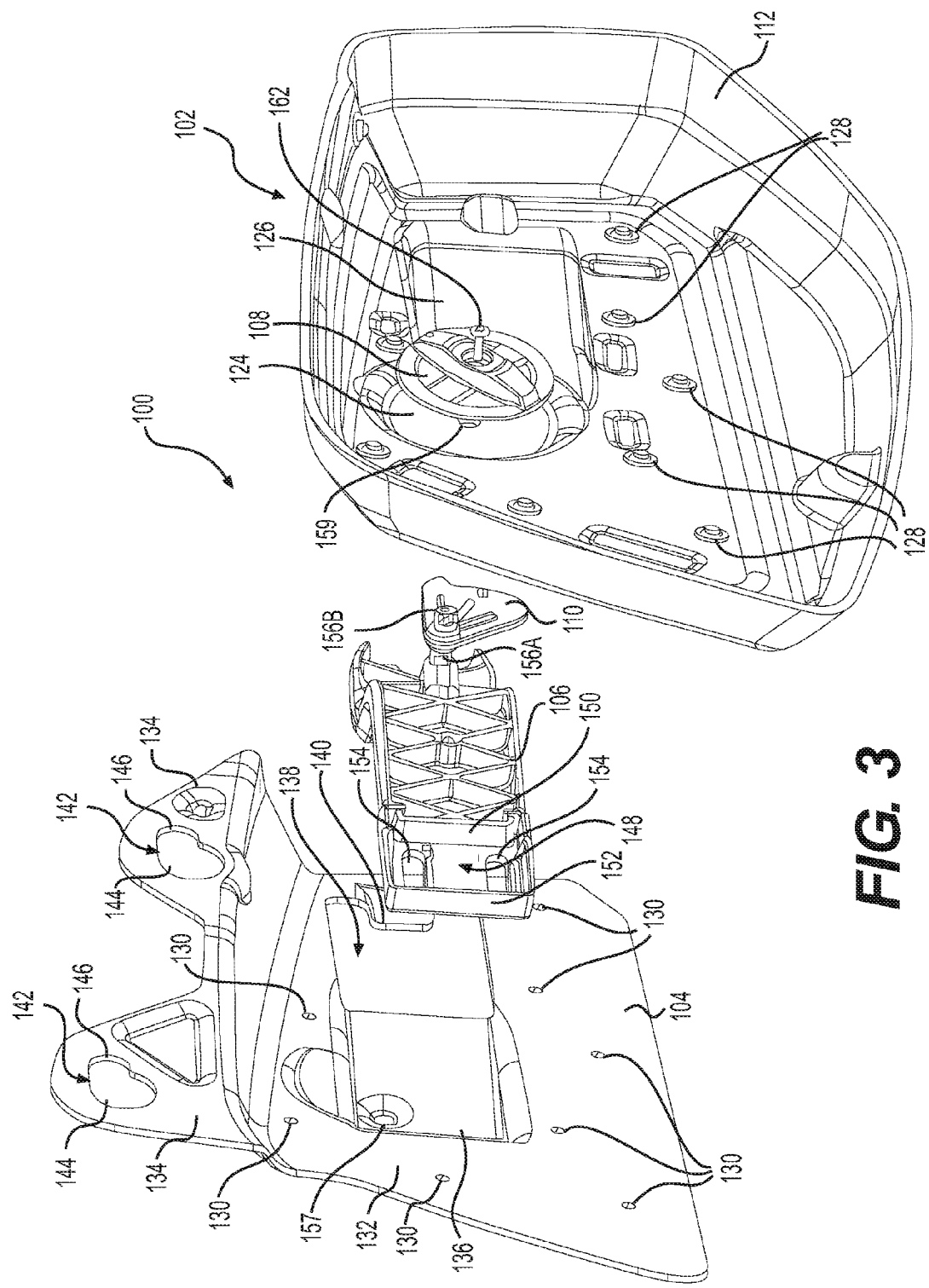
FIG. 3 is an exploded view of some components of a right storage container assembly of the vehicle of FIG. 1, with a storage container of the assembly being shown in cross-section.

Turning now to FIG. 2, the handles 18 will be described in more detail. For simplicity, only the right handle 18 will be described since the left handle is a mirror image of the right handle 18.

Figure 9:
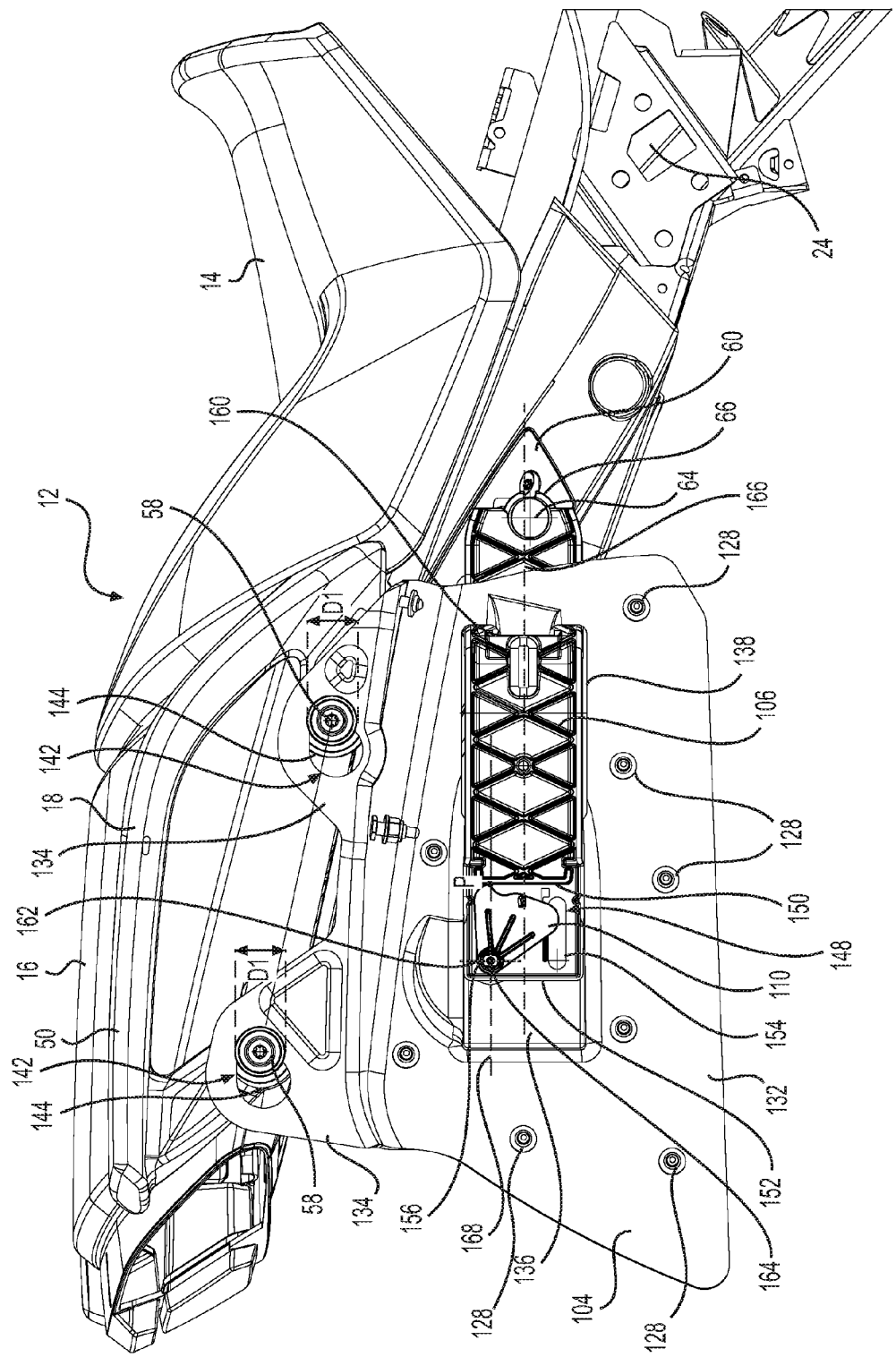
FIG. 9 is a right side elevation view of the straddle seat, the frame portion and the right storage container assembly of the vehicle of FIG. 1 with the storage container and the locking knob removed for clarity and with the storage container assembly in the locked position.
Figure 10:
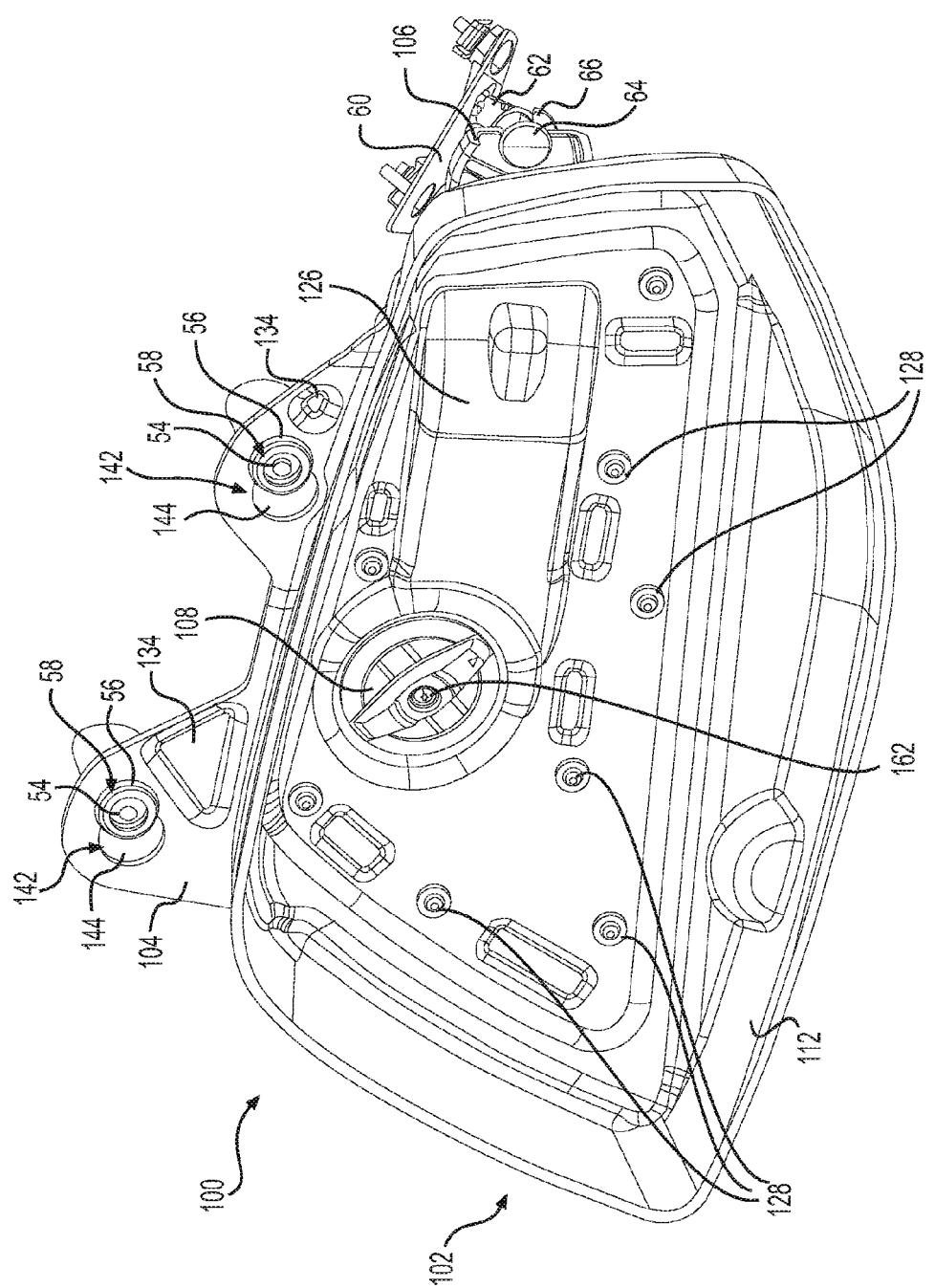
FIG. 10 is a perspective view taken from a front, right side the right storage container assembly of FIG. 3 and corresponding anchors, with the storage container shown in cross-section for clarity and with the storage container assembly in the locked position.

The handle 18 is generally C-shaped and provides a central portion 50 that the passenger of the vehicle 10 can grasp with his/her hand. The ends 52 of the handle 18 define apertures (not shown) therethrough. Threaded fasteners 54 are inserted through the apertures of the handle 18 and are fastened into the frame 24 below the seat portion 16, thereby securing the handle 18 to the frame 24. Each fastener 54 has a bushing 56 disposed around the shank and the head thereof. Each bushing 56 spaces the head of its corresponding fastener 54 from the handle 18. Each bushing 56 defines a circular flange that is spaced from the handle 18. Each circular flange has an outer diameter D1 (FIG. 9). Together, each fastener 54 and its corresponding bushing 56 form an anchor 58. The bushings 56 define the heads of the anchors 58. As can be seen, the rear anchor 58 is vertically higher than the front anchor 58.

As can also be seen in FIG. 2, a bracket 60 is connected to the frame 24. An anchor 62 is connected to and extends from the bracket 60. The anchor 62 has a head 64 having a diameter D2. A flange 66 is connected to the shank of the anchor 62 laterally inward of the head 64 so as to define a space between the head 64 and the flange 66. The diameter of the flange 66 is greater than the diameter D2 of the head 64 of the anchor 62. The anchor 62 is disposed vertically lower and forward of both anchors 58. A bracket 60, an anchor 62 and a flange 66 are also provided on the left side of the vehicle 10.

Turning now to FIGS. 3 to 12, the storage container assemblies 100 will be described in greater detail. For simplicity, only the right storage container assembly 100 will be described since the left storage container assembly 100 is a mirror image of the right storage container assembly 100.

The storage container assembly 100 has a storage container 102, a mounting bracket 104, a sliding member 106, an actuator in the form of a locking knob 108 and a cam 110. As will be described in greater detail below, the container 102 is connected to the mounting bracket 104; the mounting bracket 104 is used to hang the container assembly 100 on the anchors 58; and the locking knob 108 is used to pivot the cam 110 which in turns causes the sliding member 106 to translate to lock or unlock the container assembly 100 to the frame 24.

Figure 4:
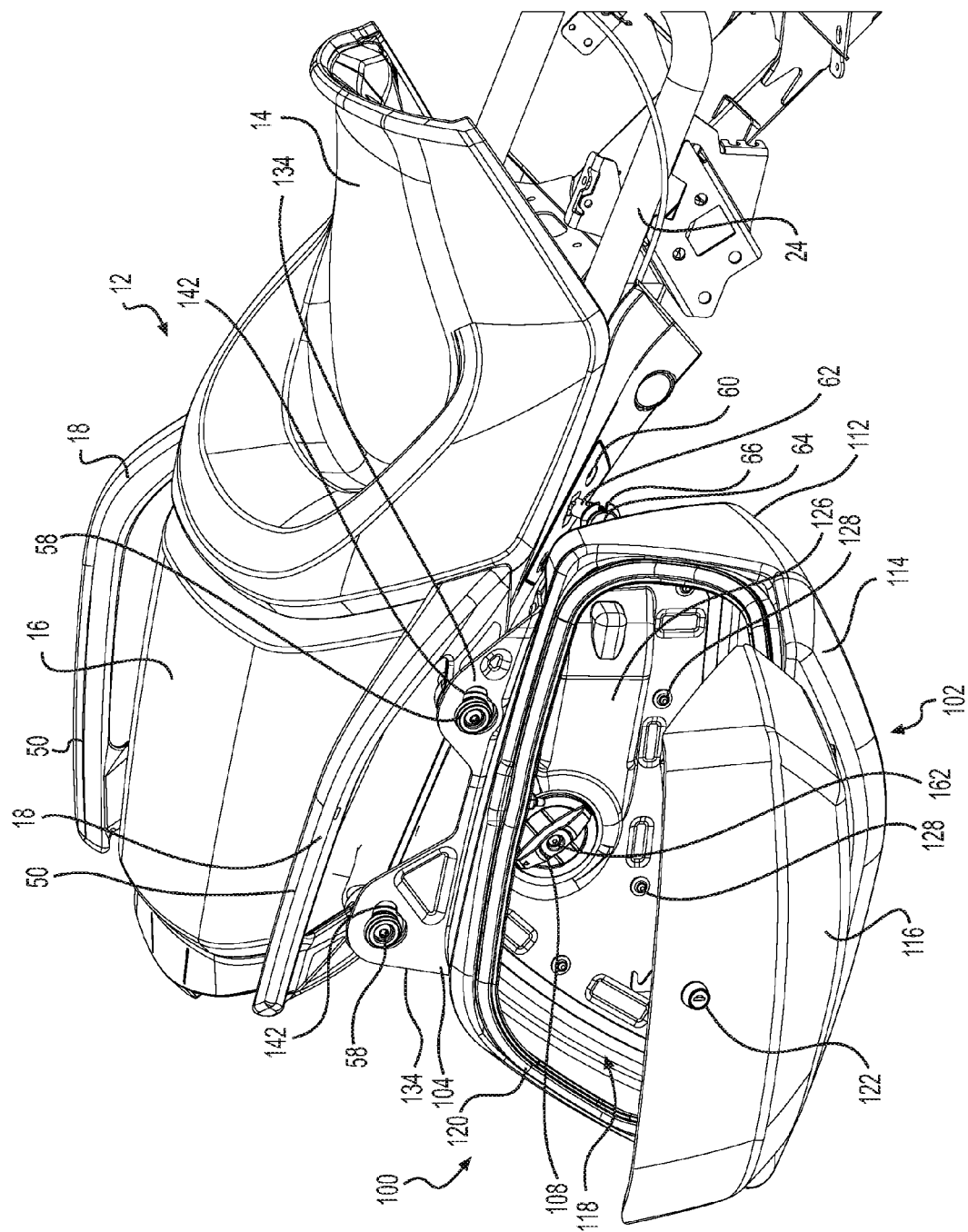
FIG. 4 is a perspective view taken from a front, right side of the straddle seat, the frame portion and the right storage container assembly of the vehicle of FIG. 1 with the storage container assembly in an unlocked position and with a cover of the storage container in an open position.

The storage container 102 is a rigid case which is sized to fit at a rear of the vehicle 10. By being rigid, the container 102 prevents the items contained therein from being damaged. It is contemplated that the storage container 102 could be a flexible bag. As best seen in FIG. 4, the container 102 has a side portion 112, a lower portion 114 and a cover 116. The lower portion 114 is integrally formed with the side portion 112. The portions 112, 114 define an opening 118 to permit access to the inside of the container 102. The cover 116 is hinged along its lower edge to the lower portion 114. The cover 116 is movable about the hinge (not shown) between an open position (shown in FIG. 4) permitting access to the interior of the container 102 via the opening 108 and a closed position (shown in FIG. 1) preventing access to the interior of the container 102. In order to help prevent the entry of water inside the container 102, due to rain for example, a seal 120 is disposed around the opening 118. When the cover 116 is closed, the cover 116 abuts and slightly compresses the seal 120. A lock 122 is provided on the cover 116. The lock 122 allows the cover 116 to be locked in the closed position to prevent the cover 116 from being opened unless the correct key is used to unlock the lock 122. It is contemplated that other types of locks, such as a combination lock, could be used. It is also contemplated that the lock 122 could be provided elsewhere on the container 102, proximate to the cover 116. It is also contemplated that the lock 122 could be omitted. It is contemplated that the container 102 could have a construction that differs from the one described above. For example, the two portions 112, 114 could be separate parts that are fixedly connected to each other. In another example, the lower portion 114 could be omitted and the cover 116 could be resized so as to form a complete side of the container 102.

The side portion 112 of the container 102 defines a recess 124 to receive the locking knob 108 inside the container 102. The side portion 112 of the container 102 also defines a recess 126 to receive a portion of the sliding member 106 outside of the container 102. The side portion 112 has a plurality of apertures (not shown) through which rivets 128 (only some of which are labeled for clarity) are inserted. The rivets 128 are also inserted through apertures 130 (only some of which are labeled for clarity) in the mounting bracket 104, thereby fastening the side portion 112, and therefore the storage container 102, to the mounting bracket 104. It is contemplated that the rivets 128 could be replaced by other types of fasteners, such as nuts and bolts for example. It is also contemplated that the rivets 128 could be omitted and that the side portion 112 and the mounting bracket 116 could be bonded or welded to each other. It is also contemplated that the rivets 128 could be omitted and that the side portion 112 and the mounting bracket 116 could be integrally formed. Such an integrally formed part could be made by a blow-molding or 3D printing process for example.

Figure 6:
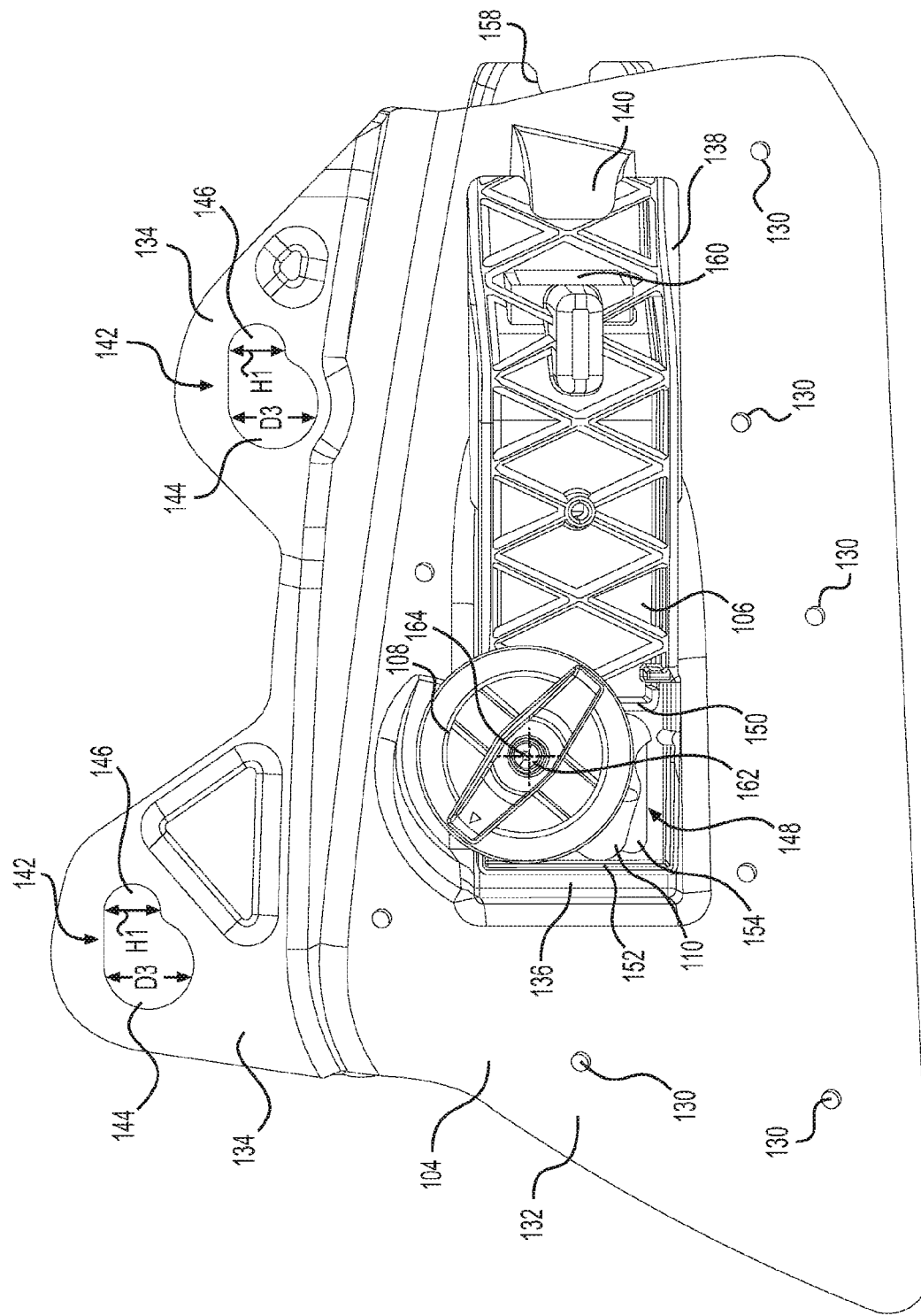
FIG. 6 is a right side elevation view of the right storage container assembly of FIG. 3 with the storage container removed for clarity and with the storage container assembly in the unlocked position.
Figure 7:
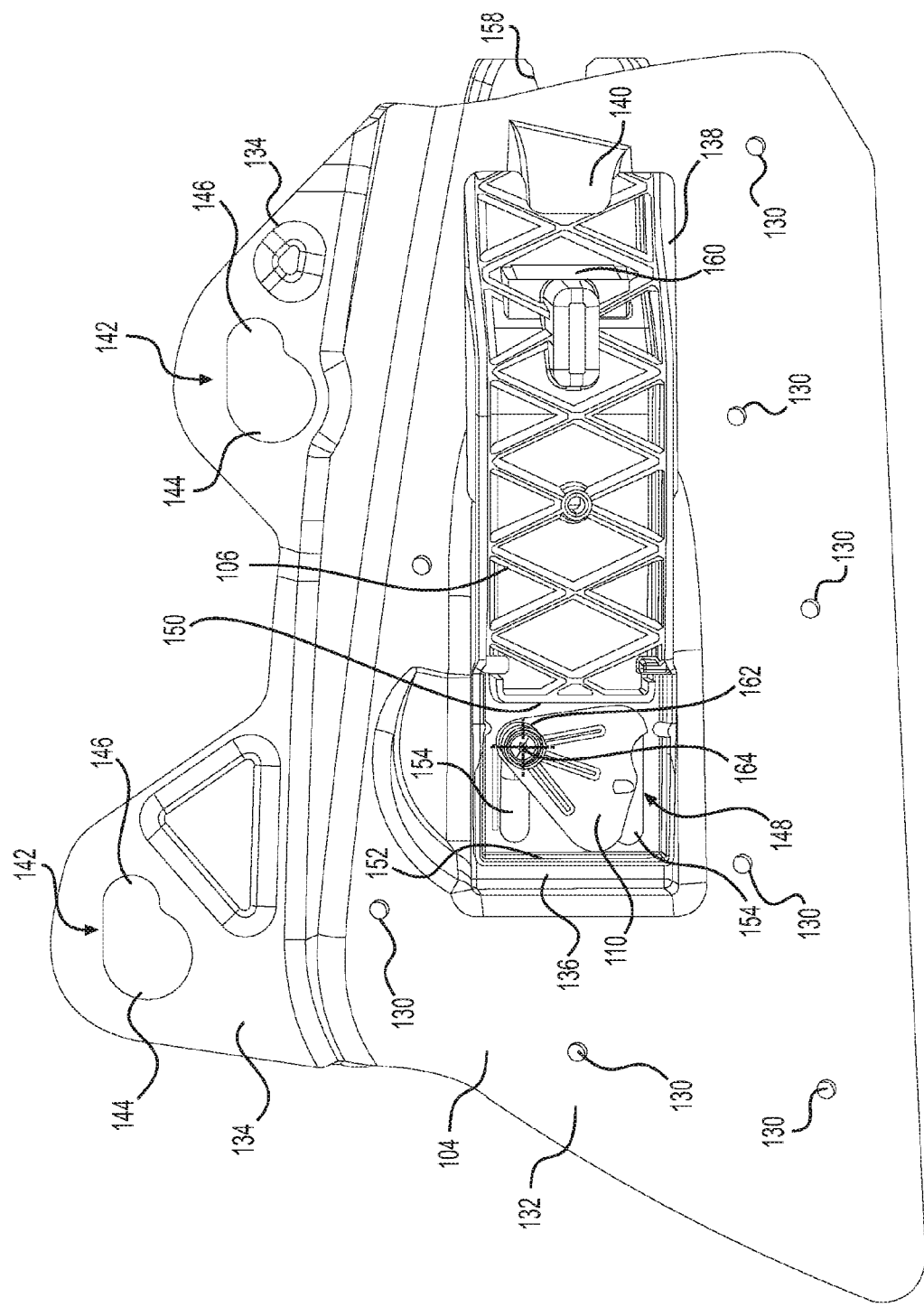
FIG. 7 is a right side elevation view of the right storage container assembly of FIG. 3 with the storage container and a locking knob removed for clarity and with the storage container assembly in the unlocked position.

The mounting bracket 104 has a mounting plate 132 and two tabs 134 extending from the upper end of the mounting plate 132. The mounting plate 132 is shaped so as to generally follow a shape of the side portion 112 of the container 102. The apertures 130 used to connect the container 102 to the mounting bracket 104 are defined in the mounting plate 132. The mounting plate 132 defines a recess 136 to receive a portion of the sliding member 106 therein. When assembled, the recess 126 in the side portion 112 and the recess 136 in the mounting plate 132 form a channel inside which a portion of the sliding member 106 is received. The mounting plate 132 also defines an aperture 138 (FIG. 3) though which the sliding member 106 extends. A tongue 140 is defined by the mounting plate 132 along a front of the aperture 138. Each tab 134 defines an aperture 142 therein. The apertures 142 are disposed vertically higher than the sliding member 106 and the container 102. As can be seen in FIG. 6, each aperture 142 has a generally circular portion 144 and a portion 146 extending from the circular portion 144 toward a front of the vehicle 10. The circular portions 114 each have a diameter D3 that is greater than the diameter D1 of the head of the anchors 58. As such, the anchors 58 can be inserted through the apertures 142 as will be discussed in more detail below. The portions 146 each have height H1 that is greater than a diameter of the shank of the anchors 58, but that is smaller than the diameter D1 of the head of the anchors 58. As such, when the anchors 58 are received in the portions 146 of the apertures 142, the heads of the anchors 58 prevent the storage container 102 from being pulled laterally away from the vehicle 10 as will be discussed in more detail below.

Figure 11:
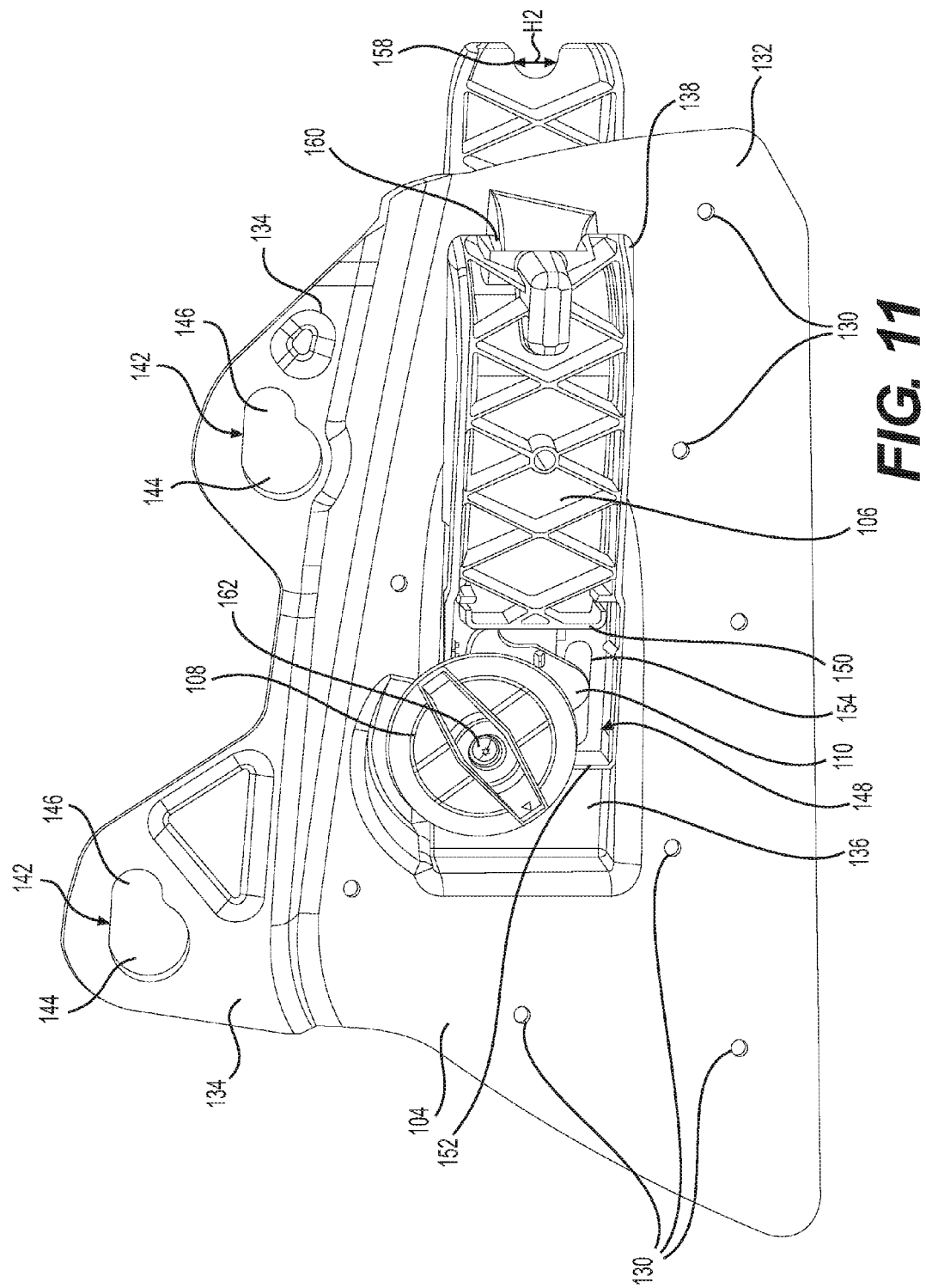
FIG. 11 is a right side elevation view of the right storage container assembly of FIG. 3 with the storage container removed for clarity and with the storage container assembly in the locked position.
Figure 12:
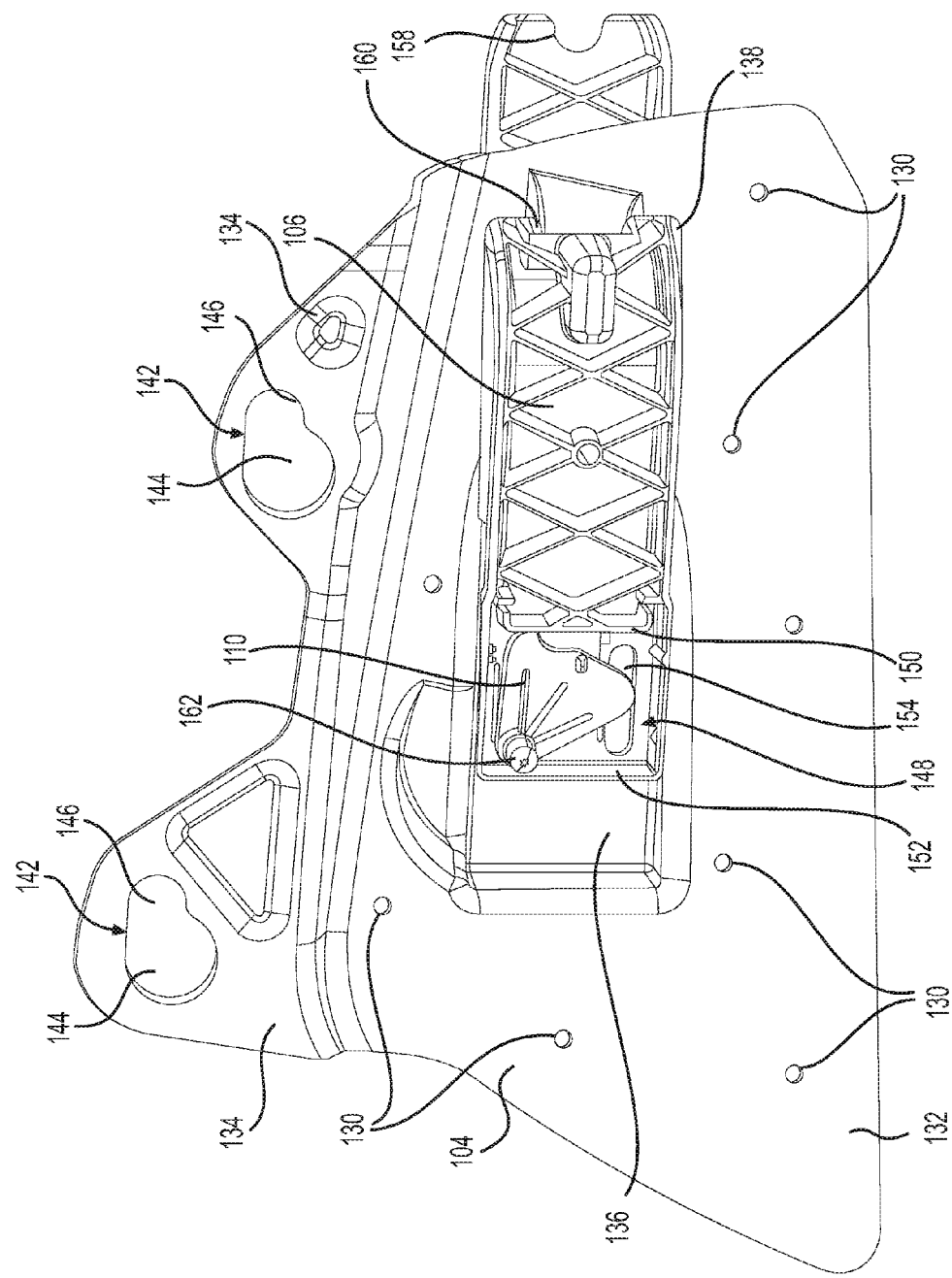
FIG. 12 is a right side elevation view of the right storage container assembly of FIG. 3 with the storage container and the locking knob removed for clarity and with the storage container assembly in the locked position.

The sliding member 106 is bent in two places such that from its rear end, the sliding member extends longitudinally forward, then laterally toward a longitudinal center plane of the vehicle 10, and then longitudinally forward. The sliding member 106 passes through the aperture 138 in the mounting bracket 104 such that the rear portion of the sliding member 106 is received between the storage container 102 and the mounting bracket 104 in the channel formed by the recesses 126, 136. The forward portion of the sliding member 106 is disposed laterally inward from the storage container 102 and the mounting bracket 104. The rear portion of the sliding member 106 defines a space 148. The space 148 is disposed between a front wall 150 and a rear wall 152. The cam 110 is disposed inside the space 148 as will be described below. Two slots 154 (FIG. 3) are defined in the side wall of the space 148. The lower slot 154 is provided such that the part can be used as the sliding member 106 for the storage container assembly 100 on the left side of the vehicle 100. As best seen in FIGS. 11 and 12, the front end of the sliding member 106 defines a recess 158. The recess 158 has a height H2 that is greater than a diameter of the shank of the anchor 62 but that is smaller than the diameter D2 of the head 64 of the anchor 62. As will be explained in greater detail below, the sliding member 106 can be translated between a retracted position illustrated in FIGS. 4 to 7 and an extended position illustrated in FIGS. 8 to 12. The sliding member 106 defines a groove 160, best seen in FIGS. 6 and 7, inside which the tongue 140 is received when the sliding member 106 is in the extended position. The engagement of the groove 160 by the tongue 140 helps prevent the removal of the sliding member 106 through the aperture 138 of the mounting bracket 104 when the sliding member 106 is in the extended position, which corresponds to a locked position of the storage container assembly 100.

The cam 110 is generally triangular. A discussed above, the cam 110 is disposed in the space 148 defined by the sliding member 106. As such, the cam 110 is disposed between the container 102 and the mounting bracket 104. The cam 110 has a projection 156A that extends inward through the upper slot 154 of the sliding member 106 and into a corresponding secondary recess 157 (FIG. 3) within the recess 136. The cam 110 also has a projection 156B that extends outward from the cam 110 through an aperture 159 in the recess 124 and into the interior of the container 102. The end of the projection 156B is splined. The knob 108 is disposed in the interior of the container 102 in the recess 124, opposite the cam 110. The knob 108 and the projections 156A, 156B are coaxial. A fastener 162 is inserted through a center of the knob 108, through the side portion 112 of the container 102 and into the projection 156B to fasten the knob 108 to the projection 156B, and thereby to the cam 110. The splined end of the projection 156B engages splines (not shown) defined in the knob 108 such that when the knob 108 is pivoted, the cam 110 pivots with it about a pivot axis 164.

Figure 8:
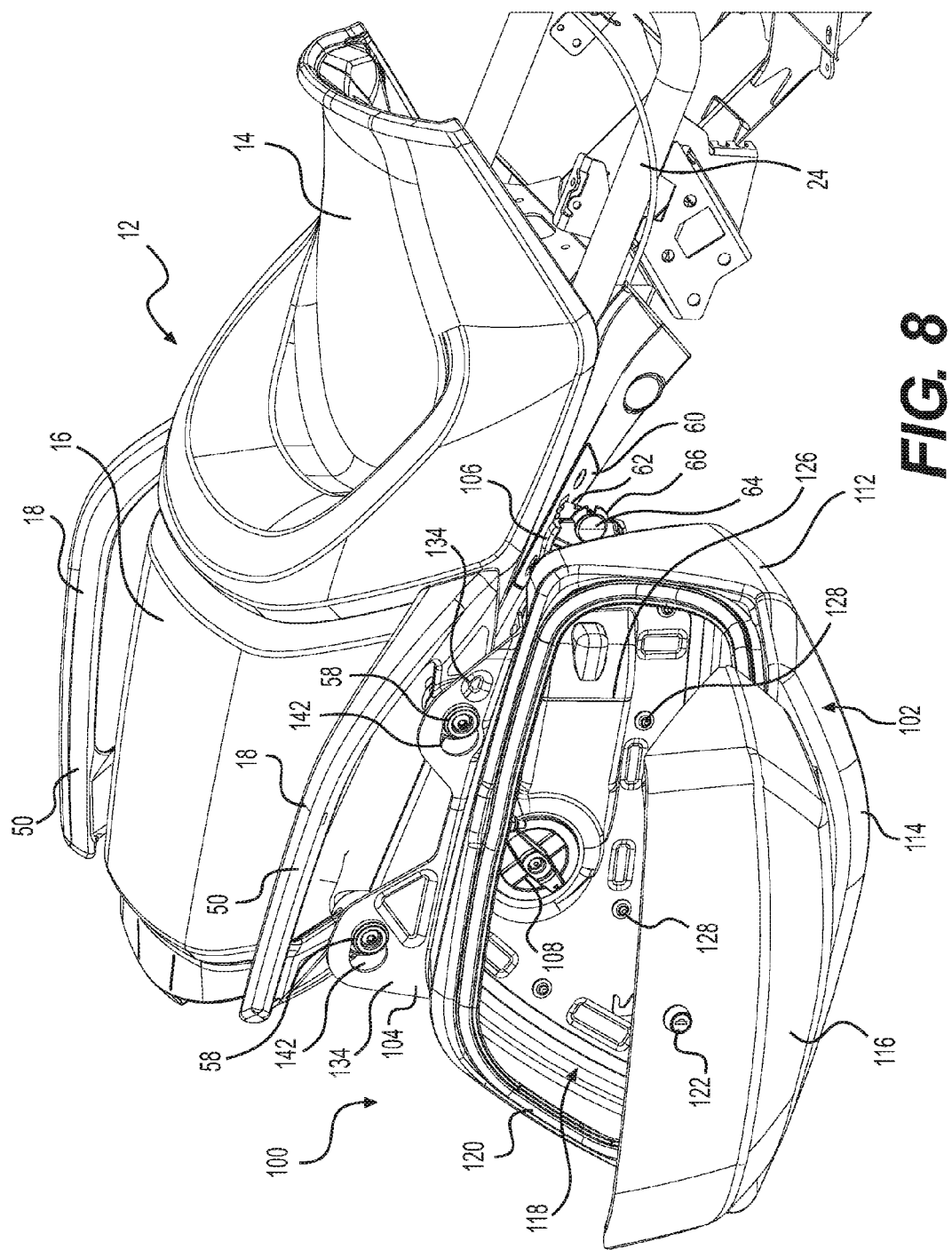
FIG. 8 is a perspective view taken from a front, right side of the straddle seat, the frame portion and the right storage container assembly of the vehicle of FIG. 1 with the storage container assembly in the locked position and with the cover of the storage container in the open position.

When the sliding member 106 is in its retracted position shown in FIGS. 4 to 7, the knob 108 and the cam 110 are in the positions shown in these figures. From these positions, pivoting the knob 108 counter-clockwise (with respect to the orientation shown in the figures) causes the cam 110 to pivot counter-clockwise about the pivot axis 164. As the cam 110 pivots counter-clockwise, it abuts the front wall 150 defined by the sliding member 106 and pushes the front wall 150 toward a front of the vehicle 10. As a result, the sliding member 106 translates toward its extended position shown in FIGS. 8 to 12 along its translation axis 166 (FIG. 9). As can be seen in FIG. 9, when the sliding member 106 is in its extended position, a contact point P between the cam 110 and the front wall 150 is disposed on a line 168 that is parallel to the translation axis 166 and passes through the pivot axis 164. As a result, the sliding member 106 cannot be translated back to its retracted position by pushing on the front end of the sliding member 106 toward the rear of the vehicle 10, thus effectively locking the sliding member 106 in the extended position. From its extended position, the sliding member 106 can be translated back to its retracted position through use of the knob 108, which as would be understood, can only be accessed when the lock 122 of the storage container 102 is unlocked and the cover 116 is opened as shown in FIG. 8. To move the sliding member 106 back toward its retracted position, the knob 108 is pivoted clockwise, which causes the cam 110 to pivot clockwise about the pivot axis 164. As the cam 110 pivots clockwise, it abuts the rear wall 152 defined by the sliding member 106 and pushes the rear wall 152 toward a rear of the vehicle 10. As a result, the sliding member 106 translates toward its retracted position shown in FIGS. 4 to 7 along its translation axis 166.

The above mechanism is only one contemplated implementation of a mechanism that can be used to translate the sliding member 106 between its retracted and extended positions. Other mechanisms are contemplated. For example, it is contemplated that the cam 110 could only abut the sliding member 106 when pivoting counter-clockwise to move the sliding member towards its extended position, but that the cam would not abut the sliding member 106 when pivoting clockwise and that a spring biasing the sliding member 106 toward its retracted position would translate the sliding member 106 back toward its retracted position when permitted to do so by a position of the cam 110. Alternatively, the spring could be omitted and the sliding member 106 could be translated manually back to its retracted position once the cam 110 has been pivoted clockwise. In another example, the cam 110 is replaced by a pin connected to the knob 108 and the pin slides inside a groove in the sliding member 106 as the knob 108 pivots thereby causing the sliding member 106 to translate. In another example, the cam 110 is omitted and the knob 108 is replaced by another actuator in the form of a handle disposed inside the container 102. The handle is connected to the sliding member 106 such that when the handle is translated inside the container 102, the sliding member 106 translates with it, and the handle can be locked at least in a position corresponding to the extended position of the sliding member 106. In another example, the knob 108 and cam 110 are replaced by a switch that is only accessible by opening the cover 116 of the container 102 and an automatic actuator, such as an electric motor or a solenoid for translating the sliding member 106 between its various positions in response to a position of the switch. The above examples are only some of the contemplated implementations of mechanisms that could be used to translate the sliding member 106 and other implementations are contemplated.

Figure 5:
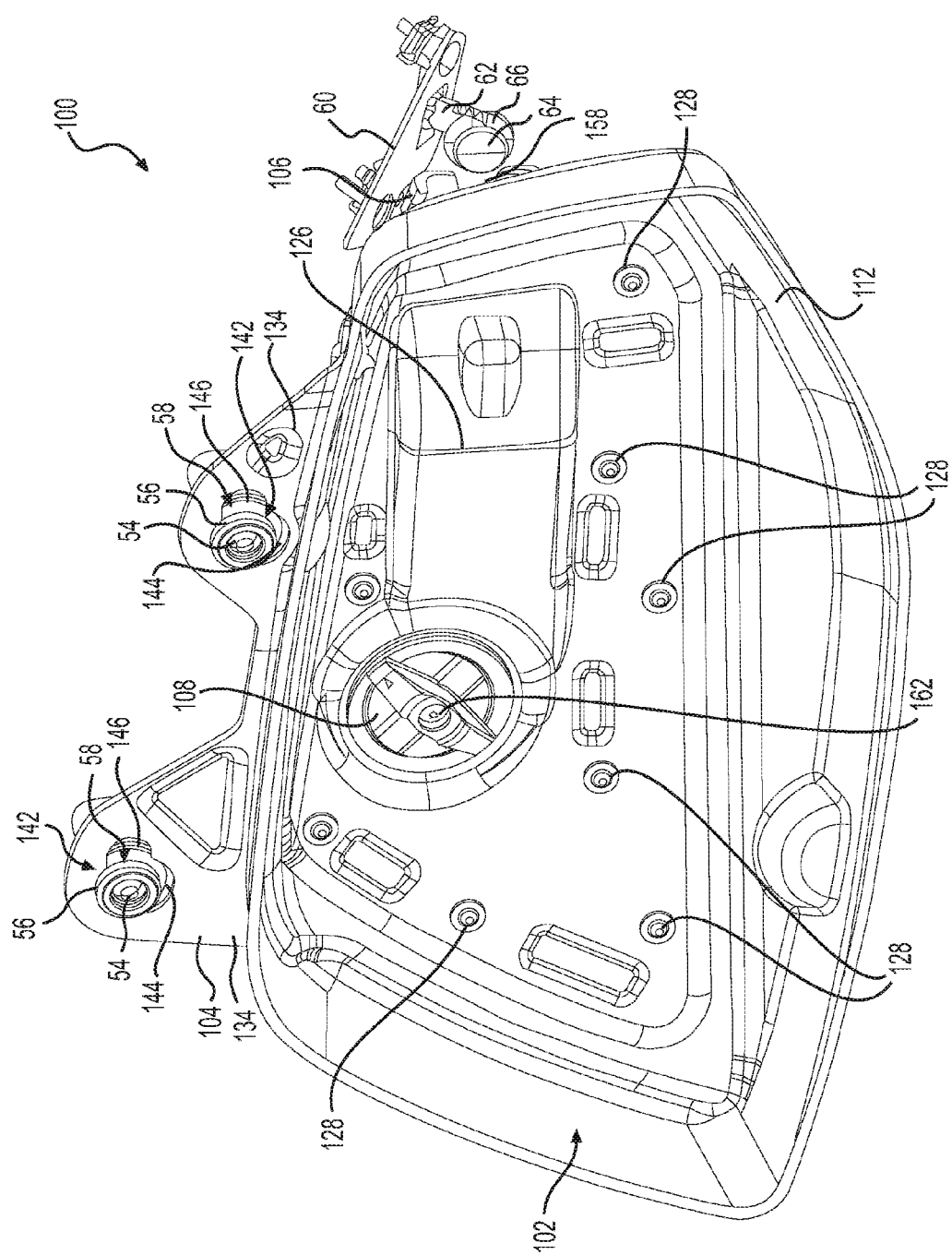
FIG. 5 is a perspective view taken from a front, right side the right storage container assembly of FIG. 3 and corresponding anchors, with the storage container shown in cross-section for clarity and with the storage container assembly in the unlocked position.

To install the storage container assembly 100, the user first moves the storage container assembly 100 toward the vehicle 10 such that the anchors 58 are received in the portions 144 of the apertures 142 of the mounting bracket 104 as shown in FIGS. 4 and 5. As a result, the storage container assembly 100 hangs from the anchors 58. If not already done, the lock 122 is unlocked and the cover 116 of the container 102 is opened, thereby providing access to the knob 108. The user then turns the knob 108 counter-clockwise to translate the sliding member 106 toward the front of the vehicle 10 to its extended position. As the sliding member 106 moves forward, its front end is received between the head 64 and the flange 66 of the anchor 62, such that the anchor 66 is received in the recess 158 in the end of the sliding member 106. As the sliding member 106 continues to translate forward with respect to the rest of the container assembly 100, the portion of the sliding member 106 defining the rear end of the recess 158 engages and abuts the anchor 62; however the sliding member 106 is not yet in the extended position shown in FIGS. 8 to 12. Starting from this point, since the sliding member 106 cannot move forward anymore, it is the rest of the storage container assembly 100 that starts moving rearward. As a result, the apertures 142 move rearward, causing the anchors 58 to be received in the portions 146 of the apertures 142. Once the sliding member 106 is in extended position, the cover 116 of the container 102 is closed and the lock 122 is locked, thereby preventing access to the knob 108. In this arrangement, the anchors 58 and 62 prevent the storage container assembly from being moved forward or backward. Also, since the diameter D1 of the heads of the anchors 58 is greater than the height H1 of the portions 146 of the apertures 142 and the diameter D2 of the head 64 of the anchor 62 is greater than the height H2 of the recess 158 of the sliding member 106, the storage container assembly 100 cannot be pulled off of the vehicle 10. Therefore, when the sliding member 106 is in the extended position, the storage container assembly 100 is effectively locked to the frame 24.

To remove the storage container assembly 100 from the vehicle 10, the lock 122 is unlocked and the cover 116 of the container 102 is opened, thereby providing access to the knob 108. The user then turns the knob 108 clockwise to translate the sliding member 106 toward the rear of the vehicle 10 to its retracted position. Once the sliding member 106 is in the retracted position, the storage container assembly 100 is unlocked from frame 24. The user then moves the storage container assembly 100 forward and slightly upward to align the heads of the anchors 58 with the portions 144 of the apertures. The user can then pull the storage container assembly 100 off of the anchors 58. If desired, the user can finally close the cover 116 of the container 102 and lock the lock 122.

In an alternative implementation, the anchor 62 is disposed rearward of the anchors 58, the portions 146 of the apertures 142 extend rearward from the portions 144 of the apertures 142, and the storage container assembly is modified to cause the sliding member 106 to translate rearward to move to its extended position. It is also contemplated that the shape of the apertures 142 could be modified and the anchors 58, 62 could be positioned to provide the structure necessary for a storage container assembly having a sliding member 106 that translates vertically or diagonally between its retracted and extended positions.

In another alternative implementation, the anchors 58 are connected to the tabs 134 and are received in aperture defined in the frame 24. The apertures have a circular portion similar to the portions 144 of the apertures 142 and narrower portions extending rearward from lower parts of the circular portions. In another alternative implementation, the anchor 62 is connected to the end the sliding member 106 and extends laterally toward the vertical center plane of the vehicle 10. In this implementation, the frame 24 defines a slot to receive and engage the anchor 62 when the sliding member 106 is in the extended position.

Figure 13:
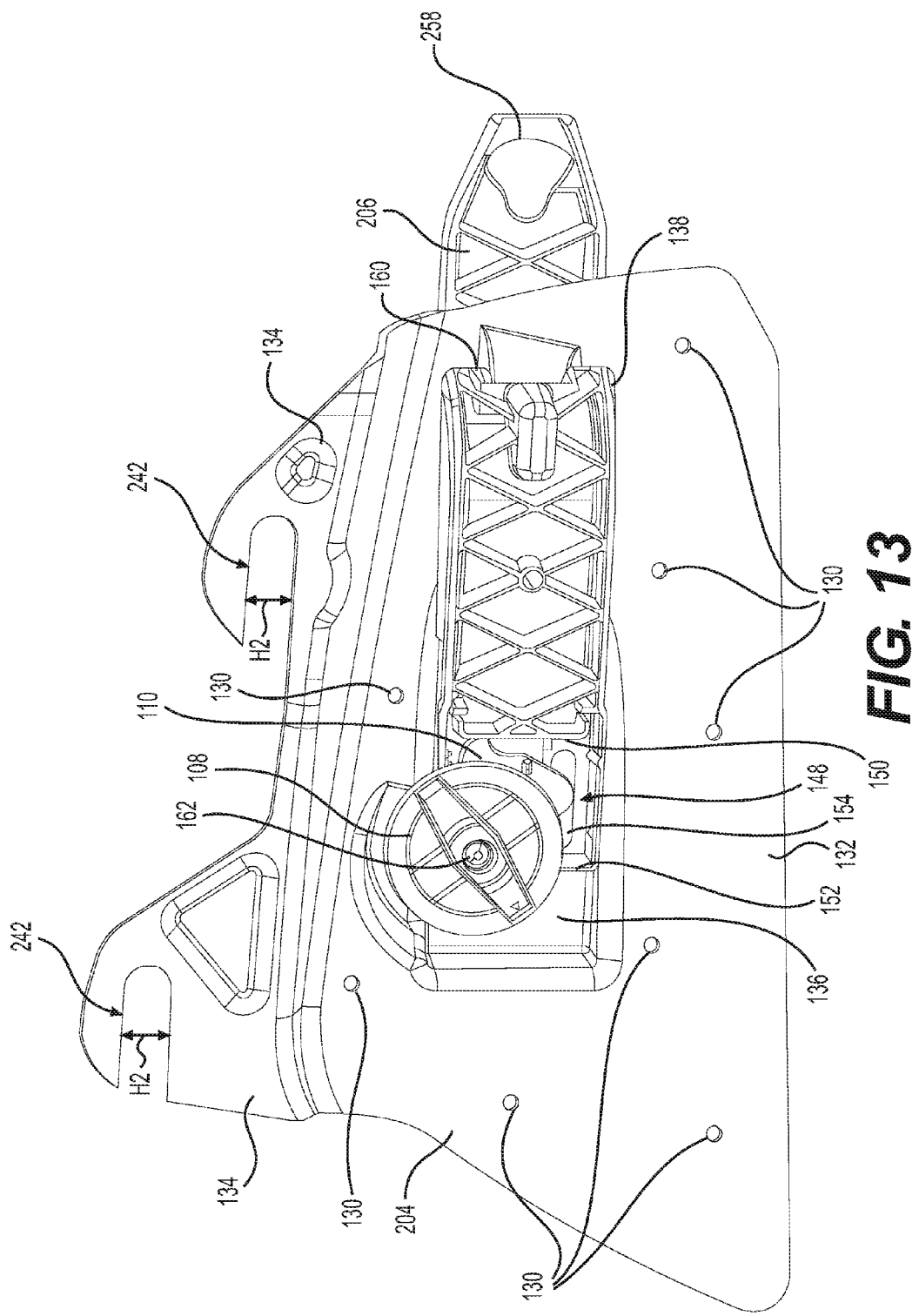
FIG. 13 is a right side elevation view of an alternative implementation of the right storage container assembly of FIG. 3 with the storage container removed for clarity and with the storage container assembly in the locked position.

FIG. 13 illustrates another implementation of the storage container assembly 100. In this implementation, the mounting plate 104 and the sliding member 106 have been replaced with a mounting plate 204 and a sliding member 206 respectively. The other components of this implementation, including the storage container 102, are the same as in the storage container assembly 100 described above. For simplicity, the components illustrated in FIG. 13 that are the same as those of the storage container assembly 100 described above have been labelled with the same reference numerals and will not be described again in detail. In the mounting plate 204, the apertures 142 have been replaced by apertures that are opened at the rear thereof, thereby forming slots 242. As such, in this implementation, the storage container assembly is slid on and off of the anchors 58 by moving the storage container assembly longitudinally. In the sliding member 206, the recess 158 has been replaced with an aperture 258. As can be seen the aperture 258 has a wide portion and a narrow portion. When installing the storage container assembly, the anchor is inserted through the wide portion of the aperture 258. The anchor 62 is then received in and engaged by the narrow portion of the aperture 258 when the sliding member 206 is translated to its extended position.

Figure 14:
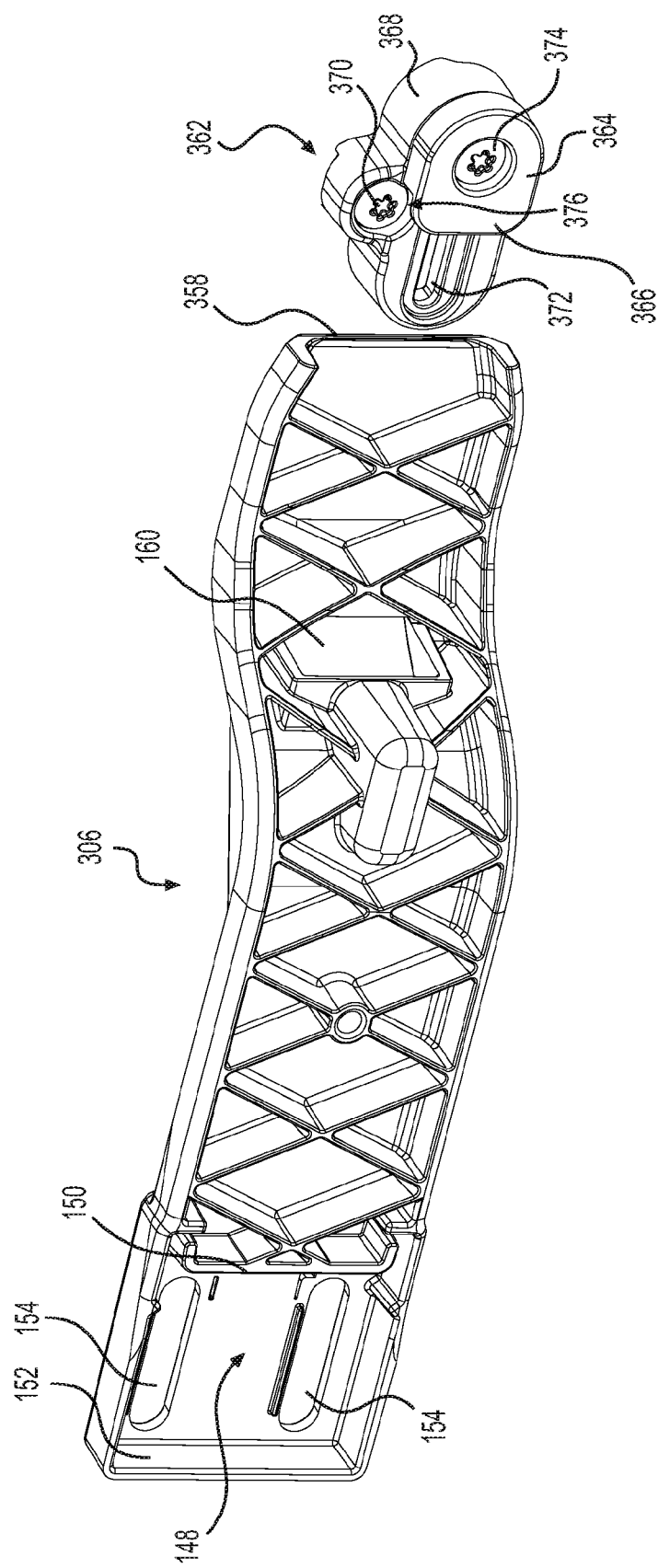
FIG. 14 is a perspective view of an alternative implementation of a sliding member and anchor for the right storage container assembly of FIG. 3 shown in the unlocked position.
Figure 15:
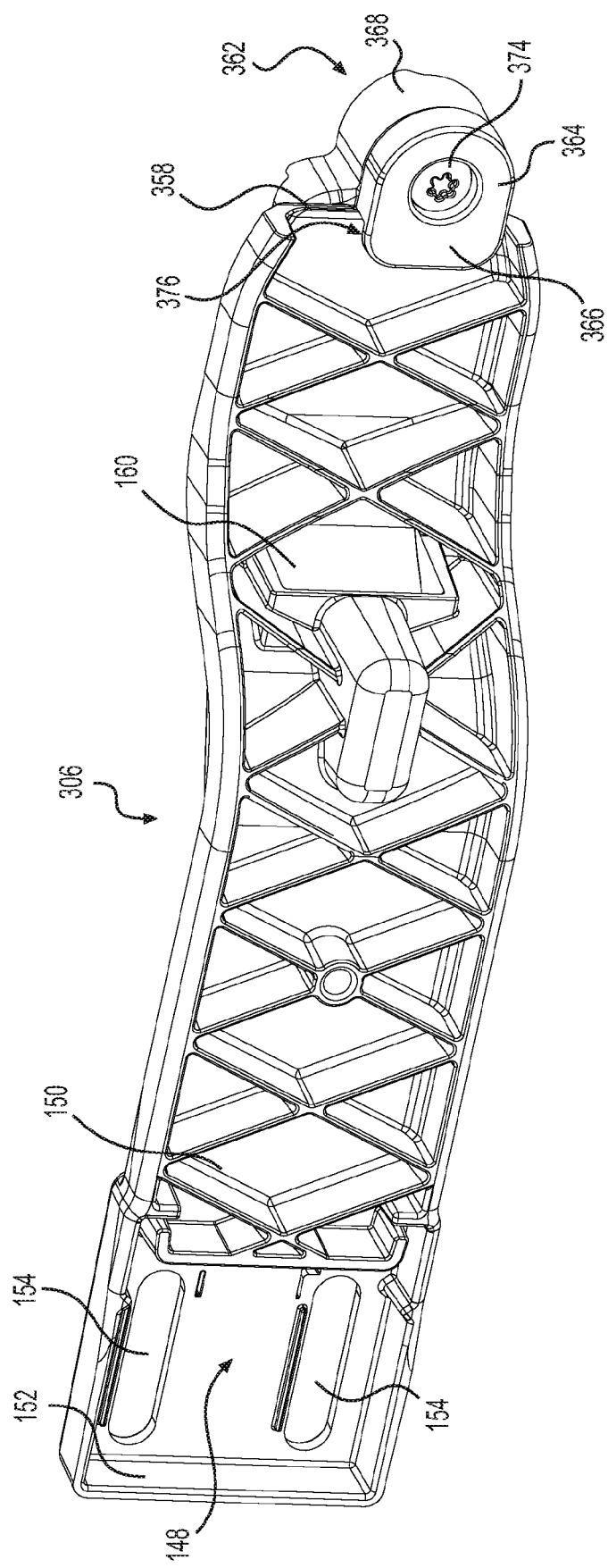
FIG. 15 is a perspective view of the sliding member and the anchor of FIG. 14 shown in the locked position.

FIGS. 14 to 16 illustrate an alternative implementation of the sliding member 106 and anchor 62 for the storage container assembly 100. In this implementation, the sliding member 106 and the anchor 62 of the storage assembly 100 described above have been replaced with a sliding member 306 and an anchor 362 respectively. The other components of the storage assembly 100, including the storage container 102, are the same as in the storage container assembly 100 described above. For simplicity, the components illustrated in FIGS. 14 to 16 that are the same as those of the sliding member 106 and the anchor 62 described above have been labelled with the same reference numerals and will not be described again in detail. In the sliding member 306, the recess 158 has been omitted and, as a result, the front end 358 of the sliding member 306 is flat. The anchor 362 has a head 364 and a bracket 368. The bracket 368 is fastened to the frame 24 by a fastener 370 at a position generally corresponding to the position of the bracket 60 in the implementation described above. The bracket 368 defines a slot 372. The head 364 is fastened to the bracket 368 by a fastener 374 inserted through the slot 372. The slot 372 permits the adjustment of the position head 364. As best seen in FIG. 16, the head 364 defines a rearwardly extending tab 366. A gap 376 is defined between the tab 366 and the bracket 368. As can be seen in FIG. 15, in the locked position, the sliding member 306 engages the anchor 362 by having the end 358 of the sliding member 306 received in the gap 376, thus preventing the removal of the storage container assembly 100 from the frame 24. In the present implementation, the end 358 of the sliding member 306 abuts the head 364 in the locked position, but it is contemplated that they could be spaced from each other while still having the end 358 of the sliding member 306 between the tab 366 and bracket 368. In the unlocked position, as shown in FIG. 14, the end 358 of the sliding member 306 is not in the gap 376, thus permitting removal of the storage container assembly 100.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:
1. A vehicle comprising:
a frame;
at least one seat mounted to the frame;
a storage container assembly selectively connected to the frame, the storage container assembly comprising:
  a mounting bracket;
  a storage container mounted to the mounting bracket, the storage container having a cover, the cover having an open position providing access to an interior of the storage container and a closed position preventing access to the interior of the storage container;
  a sliding member translatable between a retracted position and an extended position; and
  an actuator for translating the sliding member from the retracted position to the extended position, the actuator being disposed at least in part in the interior of the storage container, the actuator being accessible when the cover is in the open position, the cover preventing access to the actuator when in the closed position;
at least one first anchor connected to one of the frame and the mounting bracket, the sliding member having a first end and a second end, the first end being disposed closer to the actuator than the second end;
at least one aperture defined in another one of the mounting bracket and the frame, the at least one first anchor being received in the at least one aperture; and
a second anchor connected to one of the frame and the sliding member, the second anchor engaging another one of the frame and the sliding member when the sliding member is in the extended position, the second anchor being spaced from the other one of the frame and the sliding member when the sliding member is in the retracted position, the second anchor abutting the second end of the sliding member when the sliding member is in the extended position and being spaced from the second end of the sliding member when the sliding member is in the retracted position;
the storage container assembly being removable from the frame when the sliding member is in the retracted position, and
the at least one first anchor and the second anchor locking the storage container assembly to the frame when the sliding member is in the extended position.

2. The vehicle of claim 1, wherein the sliding member is disposed at least in part between the mounting bracket and the storage container.

3. The vehicle of claim 1, further comprising:
a motor supported by the frame;
a least two wheels operatively connected to the frame, at least one of the at least two wheels being operatively connected to the motor; and
a handlebar operatively connected to at least one of the at least two wheels;
wherein the at least one seat is a straddle seat; and
wherein the storage container assembly is disposed beside the straddle seat.

4. The vehicle of claim 1, wherein:
the second anchor defines a gap; and
an end of the sliding member is received in the gap when the sliding member is in the extended position.

5. The vehicle of claim 1, further comprising a cam connected to the actuator, the actuator pivoting the cam between a first position and a second position;
wherein in the first position of the cam, the sliding member is in the retracted position and the cam abuts the sliding member; and
wherein in the second position of the cam, the sliding member is in the extended position and the cam abuts the sliding member.

6. The vehicle of claim 5, wherein:
the actuator pivots the cam about a pivot axis;
the sliding member translates along a translation axis; and
when the cam is in the second position and the sliding member is in the extended position, a contact point between the cam and the sliding member is disposed on a line passing through the pivot axis, the line being parallel to the translation axis.

7. The vehicle of claim 1, wherein:
the at least one first anchor is two first anchors; and
the at least one aperture is two apertures.

8. The vehicle of claim 7, wherein:
the two first anchors and the second anchor are mounted to the frame; and
the two apertures are defined in the mounting bracket.

9. The vehicle of claim 8, wherein:
the sliding member translates longitudinally between the retracted and extended positions;
the second end of the sliding member defines a recess; and
the second anchor is received in the recess when the sliding member is in the extended position and is outside of the recess when the sliding member is in the retracted position.

10. The vehicle of claim 9, wherein the second end of the sliding member is closer to a front of the vehicle in the extended position than in the retracted position.

11. The vehicle of claim 9, wherein:
the two first anchors have a first head having a first diameter;
the second anchor has a second head having a second diameter;
the two apertures have at least a portion that is narrower than the first diameter; and
the recess of the sliding member has at least a portion that is narrower than the second diameter.

12. The vehicle of claim 11, wherein:
the two apertures each have a first portion having a third diameter and a second portion extending toward a front of the vehicle from the first portion;
the third diameter is greater than the first diameter;
the second portion is narrower than the first diameter; and
the two first anchors are received in the second portions of the two apertures when the sliding member is in the extended position.

13. A storage container assembly for connecting to a frame of a vehicle comprising:
a mounting bracket, the mounting bracket defining at least one aperture adapted to receive at least one first anchor of the vehicle therein;
a storage container mounted to the mounting bracket, the storage container having a cover, the cover having an open position providing access to an interior of the storage container and a closed position preventing access to the interior of the storage container;
a sliding member translatable between a retracted position and an extended position, the sliding member being adapted to engage a second anchor of the vehicle; and
an actuator for translating the sliding member from the retracted position to the extended position, the actuator being disposed at least in part in the interior of the storage container, the actuator being accessible when the cover is in the open position, the cover preventing access to the actuator when in the closed position, the sliding member having a first end and a second end, the first end being disposed closer to the actuator than the second end, the second end of the sliding member defining a recess adapted for receiving the second anchor when the sliding member is in the extended position.

14. The assembly of claim 13, wherein the at least one aperture is two apertures.

15. The assembly of claim 14, wherein:
the two apertures each have a first portion having a diameter and a second portion extending toward a front of the vehicle from the first portion; and
the two first anchors are received in the second portions of the two apertures when the sliding member is in the extended position.

16. The assembly of claim 13, wherein:
the at least one aperture has at least a portion that is narrower than a diameter of a head of the at least one first anchor; and
the recess has at least a portion that is narrower than a diameter of a head of the second anchor.

17. The assembly of claim 13, wherein the at least one aperture is vertically higher than the sliding member.

18. The assembly of claim 13, further comprising a cam connected to the actuator, the actuator pivoting the cam between a first position and a second position;
wherein in the first position of the cam, the sliding member is in the retracted position and the cam abuts the sliding member; and
wherein in the second position of the cam, the sliding member is in the extended position and the cam abuts the sliding member.

19. The assembly of claim 18, wherein:
the actuator pivots the cam about a pivot axis;
the sliding member translates along a translation axis; and
when the cam is in the second position and the sliding member is in the extended position, a contact point between the cam and the sliding member is disposed on a line passing through the pivot axis, the line being parallel to the translation axis.

20. The assembly of claim 13, wherein the sliding member is disposed at least in part between the mounting bracket and the storage container.

21. The assembly of claim 13, further comprising a lock for locking the cover in the locked position.

* * * * *